United States Patent
Boehringer

[15] 3,677,488
[45] July 18, 1972

[54] TRIM AND DAMPING CYLINDER
[72] Inventor: Wilfred E. Boehringer, Fullerton, Calif.
[73] Assignee: McDonnell Douglas Corporation
[22] Filed: Feb. 16, 1971
[21] Appl. No.: 115,229

[52] U.S. Cl. ..........................244/103 R, 92/62, 188/280
[51] Int. Cl. .....................................................B64c 25/34
[58] Field of Search............92/62; 91/167; 188/280, 318, 188/317, 312, 281, 282; 244/103 R, 102 R, 104 R, 50

[56] References Cited

UNITED STATES PATENTS 3,288,036  11/1966  Fisher.........................................92/62
3,458,016  7/1969  Keech................................188/317 X Primary Examiner—Milton Buchler
Assistant Examiner—Paul E. Sauberer
Attorney—Walter J. Jason, Donald L. Royer and George W. Finch

[57] ABSTRACT

A centering and damping cylinder which includes a primary piston for damping and a secondary piston for trim, each piston being of the differential area type and slidable within an internally stepped cylinder housing. In addition to a damping orifice in the primary piston, an internal relief valve may be provided within the cylinder for relieving pressure when the damping orifice cannot handle the required damping flow rate.

15 Claims, 5 Drawing Figures

Patented July 18, 1972

INVENTOR.
WILFRED E. BOEHRINGER
BY George O. Finch
-ATTORNEY-

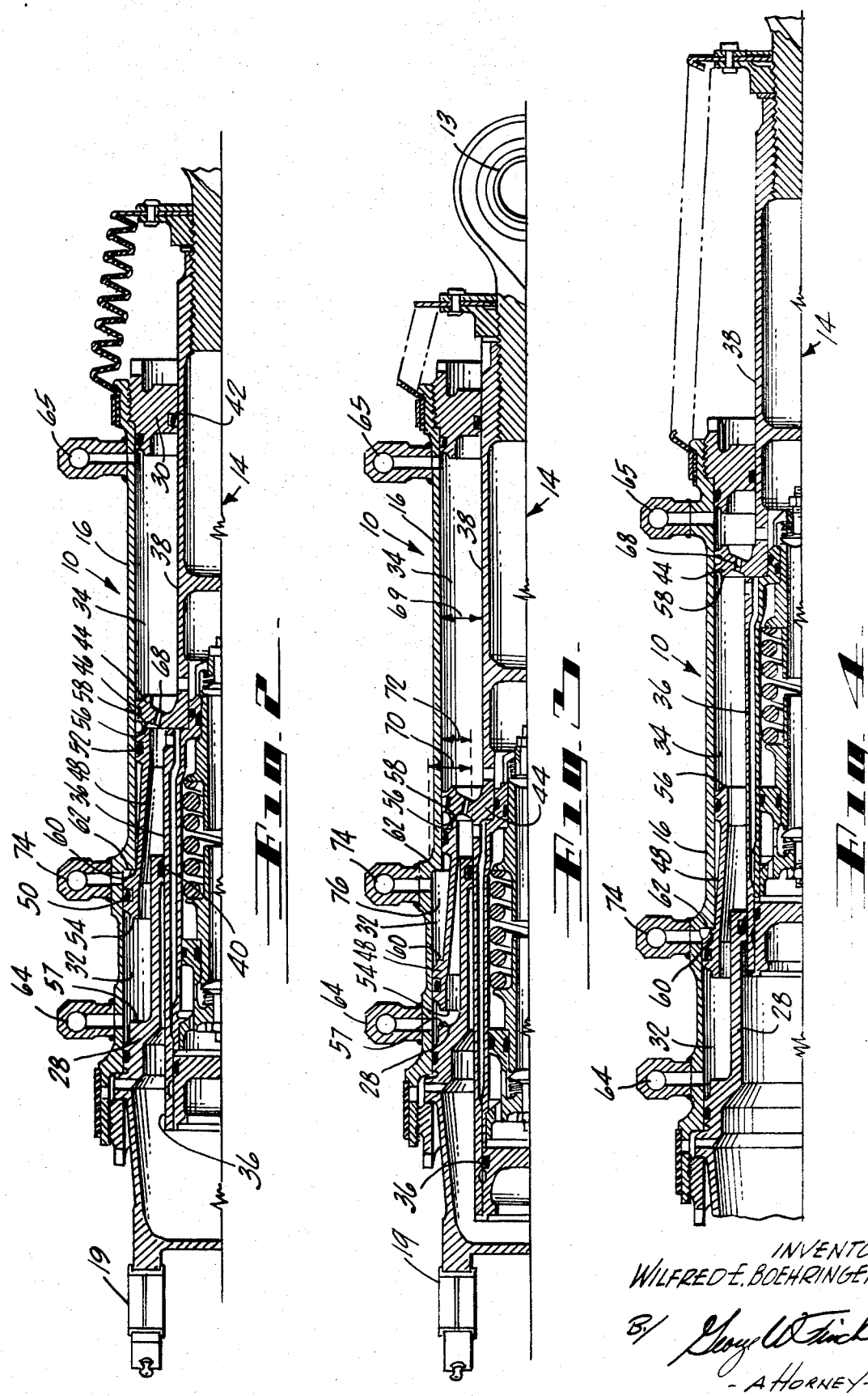

TRIM AND DAMPING CYLINDER

BACKGROUND OF THE INVENTION

Self-centering dampers heretofore known in the art have presented many problems due to disadvantages inherent in their designs. For example, some self-centering dampers are of the internally pressurized type whose centering and damping characteristics tend to undesirably vary with temperature. In addition, such devices must exert high pressures on the seals therein causing leaks. The loss of only a small amount of pressurizing medium impairs damping and destroys the centering ability of such dampers. Also, such devices in some instances have been designed in a nonfailsafe manner so that a minor bind therein can cause the uncovering of one or more seals and the failure of the device.

The known externally pressurized self-centering dampers, on the other hand, have the disadvantage of requiring relatively large ports and hydraulic lines since the damping action thereof is generated by externally exhausting working medium from one pressurizing port thereof into another. This is particularly disadvantageous when the dampers are used to trim the landing gear bogies of large aircraft where the fluid flow rate required for the needed damping becomes greater than the flow rate that is possible through reasonably sized pressurizing ports and interconnecting hydraulic lines.

BRIEF SUMMARY OF THE INVENTION

The present centering and damping cylinder is designed primarily for use in damping vibrations and trimming aircraft landing gear bogies but it is adaptable to many other applications where a source of pressurized medium is available. The cylinder, as usually installed, levels or positions the bogie for landing gear retraction and absorbs energy tending to pitch the bogie during the landing touchdown. The cylinder also includes means which enable the drooping of the bogie for a specific gear retraction envelope or to absorb additional impact energy during landing touchdown.

The present cylinder is of the externally pressurized type so that the inherent problems of sealed internally pressurized dampers, discussed above, are eliminated. The cylinder is designed so that all high rate fluid flow can be ported internally in the cylinder through an internal relief valve and therefore even excessive damping flows do not have to be exhausted out of the cylinder ports as is typical of the prior art externally pressurized self-centering dampers.

The cylinder includes a primary piston for damping and a secondary piston for trim or centering with each piston being of the differential area type and slidable within an internally stepped cylinder housing. When the cylinder is installed as a bogie damper, the primary piston and its connecting rod are usually attached to the landing gear strut while the cylinder housing is attached to the bogie. A pair of pressure ports communicate hydraulic pressure from the system that powers the landing gear extend and retract system to both sides of the primary piston while an optional drooping pressure port communicates controlled hydraulic pressure to the interior of the secondary piston. Differential areas between the stepped cylinder and the primary and secondary pistons are so arranged that the pressure admitted through the pair of ports tends to move the primary piston in a retract direction and the secondary piston in the opposite or extend direction. The operative working area of the secondary piston exceeds that of the primary piston and therefore when the two pistons come into contact, the secondary piston moves or brings the primary piston to a stop at a point determined by the stepped portion of the cylinder housing which prevents further movement of the secondary piston in the extend direction. When the bogie is to be drooped, pressure is admitted to the optional drooping port which causes the secondary piston to move away from the internal step in the retract direction thereby freeing the primary piston to retract even further. If no bogie droop is desired, the drooping port is vented.

During a landing the primary piston normally provides damping action by means of at least one damping orifice therethrough or thereabout, through which the hydraulic fluid is forced by movements of the bogie with respect to the landing gear strut. If during landing the pressures within the cylinder reach too high a level, an internal high flow rate relief valve opens to relieve the pressure across the primary piston. Therefore all high flow rates are bypassed from one side of the primary piston to the other within the cylinder and only the volume of fluid for the centering differential area must be exhausted and resupplied to the cylinder through the pair of pressure ports. Since centering can be a relatively slow process and since the centering differential area need not be great, the ports can have a relatively low flow rate capacity. The ports may include orifices to prevent high pressures from feeding back into the hydraulic system.

The present cylinder is designed to be failsafe so that no matter what hangs up therein, no seals are uncovered to allow massive leakage of hydraulic fluid. The pressurized fluid for the cylinder, used in centering to trim or droop the bogie for retraction into the fuselage, is usually supplied by the landing gear retraction hydraulic system. The cylinder is designed so that pressure in the system sufficient to retract the landing gear is also sufficient to enable the cylinder to properly position the bogie for retraction. It is therefore highly unlikely that an untrimmed bogie will even be retracted. This is desirable since the retraction of untrimmed bogies is a primary cause of structural damage to the landing gear wells of aircraft. Also, since the present cylinder is backed up by the relatively massive hydraulic system for landing gear retraction, major leaks within the trim cylinder can be tolerated since the possible volume of leakage is negligible with respect to the volume of the entire system. Therefore, an aircraft can be flown with damaged or destroyed seals in its bogie trim cylinders without fear of damage to the aircraft.

It is therefore an object of the present invention to provide a reliable self-centering damper.

Another object is to provide means for damping and absorbing energy from a landing gear bogie upon touchdown of the aircraft.

Another object is to provide a trim cylinder which can safely operate with damaged or worn seals therein.

Another object is to provide a failsafe bogie trim cylinder.

Another object is to provide a bogie trim cylinder which assures that the landing gear bogie is in proper position for retraction and/or landing.

Another object is to provide a self-centering two-way damping cylinder arranged so that high flow rates need not be exhausted during the damping cycle.

Another object is to provide a bogie trim cylinder which can be used to droop as well as level a landing gear bogie.

These and other objects and advantages of the present invention will become apparent after considering the following detailed specification which covers a preferred embodiment thereof in conjunction with the accompanying drawings wherein:

BRIEF DESCRIPTION OF THE DRAWINGS

FIG. 3 is a cross-sectional view similar to FIG. 2 but with the cylinder in a retracted condition;

FIG. 4 is also a cross-sectional view similar to FIG. 2 with the cylinder in an extended condition; and FIG. 5 is a further enlarged cross-sectional view of relief valve means within the cylinder assembly.

DESCRIPTION OF THE SHOWN EMBODIMENT

Figure 1:
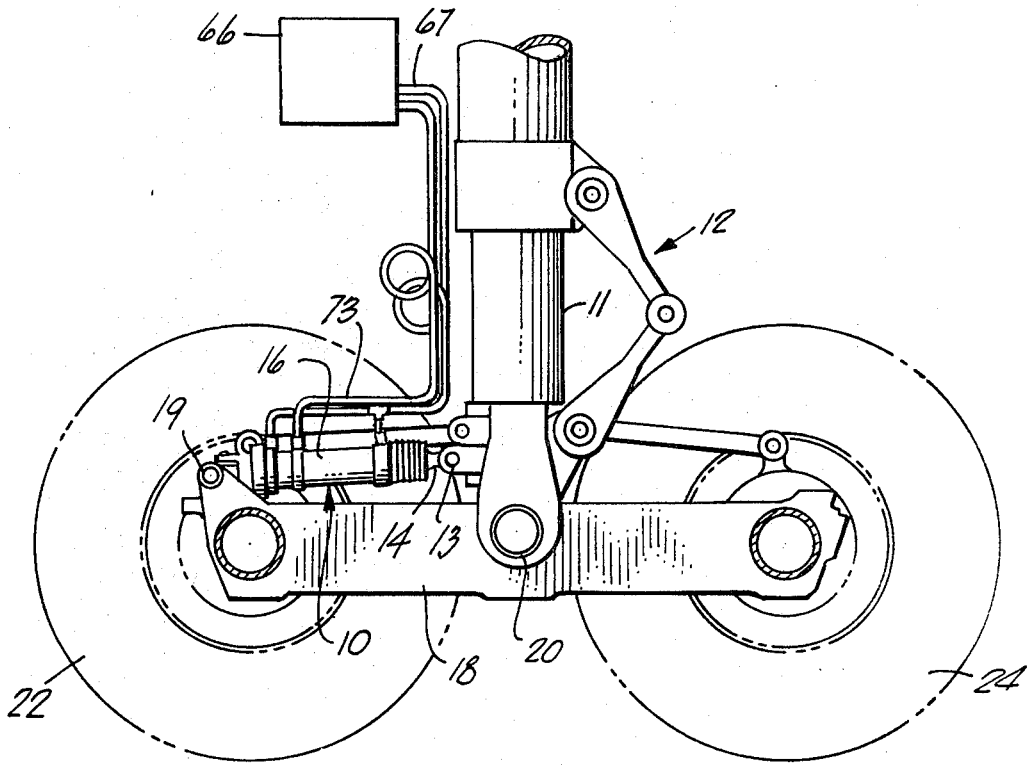
FIG. 1 is a partially cutaway view of a landing gear including a bogie with the present trim and damping cylinder installed thereon.

Referring to the drawings more particularly by reference numbers, number 10 in FIG. 1 refers to a trim and damping cylinder constructed according to the present invention. The cylinder 10 is shown connected to the landing gear strut 11 of an aircraft landing gear assembly 12 by means of bearing means 13 at the end of the cylinder's piston rod 14 whereas the cylinder's housing 16 is connected to the bogie 18 of the landing gear assembly 12 by means of bearing means 19.

The bogie 18 is connected for rotation to the landing gear strut 11 by means of a pivot 20. The bogie 18 is pivotally mounted to landing gear strut 11 so that the front and back wheels, 22 and 24 respectively, connected thereto can conform to imperfections in the runway surface without applying substantial bending loads to the strut 11. As will be shown, the cylinder 10 is used to dampen vibrations between the bogie 18 and the strut 11 and to position the bogie 18 at one or more predetermined angles thereto.

The cylinder 10 is usually used to level the bogie for landing gear retraction and touchdown and to absorb energy tending to pitch the bogie during the landing touchdown. In addition, the cylinder 10 can be used to droop either the front or the back wheels, 22 and 24 respectively, for a specific gear retraction envelope or to absorb additional impact energy during landing touchdown. In FIG. 1 the cylinder 10 is shown installed above the bogie 18 between the front wheels 22, however, it should become immediately apparent that the cylinder 10 can be installed in many other positions between the bogie 18 and the landing gear strut 11.

Figure 2:
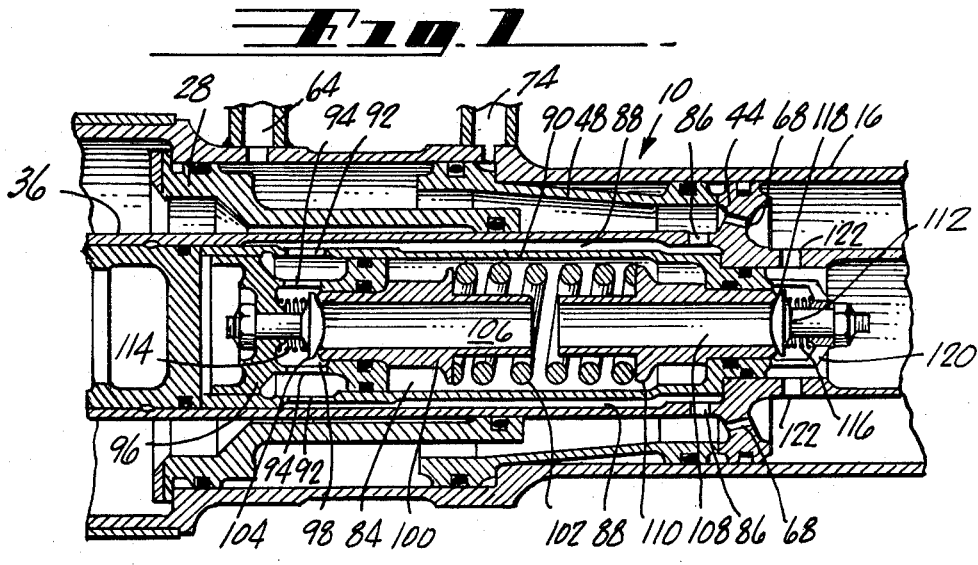
FIG. 2 is an enlarged partial cross-sectional view of the present invention in a centered condition.

Referring to FIGS. 2 through 4, it can be seen that the cylinder housing 16 includes an internal sleeve gland 28 which forms one barrier for high pressure fluid therewithin and another gland 30 threadably attached to the housing 16 at the opposite end thereof. Adjacent to the gland 28 is a first internal cylindrical surface 32 of the housing 16 while the gland 30 is adjacent a second internal cylindrical surface 34 of the housing 16 having a smaller diameter than that of the cylindrical surface 32.

The piston rod 14 includes a tail rod portion 36 and a fore rod portion 38. The larger diameter tail rod portion 36 rides within the sleeve gland 28. A packing 40 is provided to seal the space between the gland 28 and the tail rod portion 36 as the piston rod 14 slides with respect to the cylinder housing 16. The smaller diameter fore rod portion 38 in a like manner passes through gland 30 with a packing 42 therebetween to form a seal.

The primary piston 44 of the cylinder 10 is positioned between the tail and fore rod portions, 36 and 38, of the piston rod 14. The piston 44 slides on the inner cylindrical surface 34 and includes a packing or ring 46 therebetween to prevent substantial amounts of leakage between the piston 44 and the surface 34.

Also within the housing 16 is a secondary sleeve piston 48 which is constructed to slide on both the inner cylindrical surfaces 32 and 34 of the housing 16. The sleeve piston 48 includes packings 50 and 52 to form hydraulic seals between the sleeve piston 48 and the surfaces 32 and 34 respectively. The sleeve piston 48 also includes abutment surfaces 54 and 56 at the opposite ends thereof. The abutment surface 56 is adapted to engage a similar abutment surface 58 on the primary piston 44 so that when the primary piston 44 is moved to the left past a predetermined center position, as shown in FIG. 3, the sleeve piston 48 is moved to the left also. The sleeve piston 48 can be moved to the left until the abutment surface 54 thereof engages an abutment surface 57 on the sleeve gland 28.

The sleeve piston 48 also includes another abutment surface 60 which is adapted to engage a similar abutment surface 62 which forms the step between the cylindrical surfaces 32 and 34. When the primary piston 44 is moved to the right past the predetermined center position, the abutment surfaces 60 and 62 engage prohibiting the sleeve piston 48 from moving further to the right. This is shown in FIG. 4.

When in operation damping, the present cylinder 10 is pressurized with hydraulic fluid by means of ports 64 and 65 which are both connected to the same source of hydraulic pressure 66 by line 67 so that the same pressure is applied to both sides of the primary piston 44. One or more orifices 68 form passageways through the piston 44 so that when it is moved in either direction by forces exerted between the housing 16 and the piston rod 14, hydraulic fluid flows therethrough to damp out the motion.

The centering action of the present cylinder 10 can be seen more clearly by referring to FIGS. 3 and 4. In FIG. 3 the piston rod 14 is partially retracted and must move to the right to be centered. The cross-sectional area 69 of the primary piston 44 between the cylindrical surface 34 and the fore rod portion 38 is smaller than the cross-sectional area 70 defined between the cylindrical surface 32 and the tail rod portion 36. This difference in area results in more net force on the left side of the primary piston 44 which is in abutment with the sleeve piston 48 so that the piston rod 14 is forced to the right. When the rod 14 reaches the position shown in FIG. 2, the sleeve piston 48 can no longer move to the right since its abutment surface 60 comes in contact with the abutment surface 62 of the housing 16. The working area of the primary piston 44 is therefore reduced to the cross-sectional area 72 defined between the tail rod portion 36 and the cylindrical surface 34. The working area 72 is less than the area 69 tending to move the piston 44 to the left so the piston 44 and the connected piston rod 14 remain in the center position.

When the piston rod 14 is in the extended position shown in FIG. 4, the difference between working areas 69 and 72 causes the primary piston 44 and its connected piston rod 14 to move to the left until centered at which time the abutment surface 58 of the primary piston 44 comes in contact with the abutment surface 56 of the sleeve piston 48. The piston 44 moves no further to the left since to do so would require that abutment surfaces 60 and 62 separate which would increase the working area of the piston 44 on the left side to area 70 which is greater than the area 69. It should therefore be obvious that when normally configured, the piston rod 14 will always tend to resume its centered position.

As aforesaid, there are instances when it is desired to have the piston rod 14 assume a stable position other than the centered position. At these times, pressure is fed from the source 66 through line 73 and an otherwise normally vented port 74, into a chamber 76 formed between the sleeve piston 48, the cylindrical surfaces 32 and 34. When pressure is admitted through port 74 it equalizes the forces acting on the sleeve piston 48 so that the primary piston 44 can move it to the left. The sleeve piston 48, primary piston 44 and piston rod 14 continue to move to the left until the abutment surface 54 of the sleeve piston 48 comes in contact with abutment surface 57 which is formed integrally with the sleeve gland 28. Therefore, by admitting pressure by means of port 74, the piston rod 14 can be made to assume a stable retracted position. If the cylinder 10 is properly connected to the bogie 18, this causes the bogie to droop either for a specific gear retraction envelope or so that more impact energy can be absorbed by the landing gear assembly 12 than is otherwise possible with a more level bogie at touchdown.

A high flow rate relief valve assembly 54, shown in detail in FIG. 5, is provided within the cylinder assembly 10 to provide means for relieving the high internal pressures generated by rapid or large angular movements of the bogie 18 with respect to the strut 11, such as normally occur during the touchdown impact. These high pressures are generated when the position of the bogie is abruptly changed through a large angle because the orifices 68 in the primary piston 44 are sized primarily for the relatively smaller flows involved in pitch damping during normal sink rate landings.

When the primary piston 44 is moved to the left fast enough to generate the above mentioned high pressures, the hydraulic fluid from the left side of piston 44 is conducted through a plurality of openings 86 in the tail rod portion 36. From the openings 86 the fluid is conducted through a passageway 88 formed between the inner surface of the tail rod portion 36 and the housing 90 of the relief valve assembly 84. From the passageway 88 the fluid is conducted through openings 92 in the housing 90 and openings 94 in a valve end gland member 96 positioned as shown. The high pressure caused by the leftward movement of the primary piston 44 then acts against the end 98 of a plunger 100 centrally located within the gland member 98. The plunger 100 is constructed so that it can be moved to the right when the force exerted by the hydraulic fluid is sufficient to compress a relatively heavy spring 102 which bears thereagainst.

When the plunger 100 moves to the right, the end 98 thereof lifts off an associated seat member 104 thereby allowing flow of the hydraulic fluid through a passageway 106 in the plunger 100. The fluid then flows through another passageway 108 in a second plunger 110, similar to plunger 100, which acts against the face of a seat member 112 similar to the seat member 104.

The seat members 104 and 112 are both lightly spring loaded toward their associated plungers by springs 114 and 116 respectively and they are both adapted for movement outward from the plungers 100 and 110 when a pressure differential acting in an outward direction appears thereacross. It should be noted that, due to their shapes and back side areas, a pressure differential acting inward never causes them to lift off their associated plungers. Therefore, the hydraulic fluid passing through the passageway 108, causes the seat member 112 to unseat from the end 118 of the plunger 110. From there, the fluid passes through a spider 120 which supports the seat member 112 and a plurality of openings 122 in the fore rod portion 38 of the piston rod 14 to thereby relieve the pressure on the left side of the primary piston 44.

When the high pressure is on the right side of the primary piston 44, the hydraulic fluid flows through the openings 122, the spider 120 and bears against the end 118 of the plunger 110 to move the plunger 110 against spring 102 and away from the seat member 112. The fluid then flows through the passageways 108 and 106, past the seat member 104 which moves back against its spring 114, through the openings 94, 92, the passageway 88 and the opening 86 to the opposite side of the primary piston 44.

The relief valve assembly 84 therefore internally bypasses all high rate flows so that the supply ports 64 and 65 only need be large enough to supply centering fluid which, as aforesaid, is not required at high flow rates.

Thus, there has been shown and described a novel trim and damping cylinder which fulfills all of the objects and advantages sought therefor. Many changes, modifications, variations, and other uses and applications of the subject trim and damping cylinder will, however, become apparent to those skilled in the art after considering the specification together with the accompanying drawings. All such changes, modifications, variations, and other uses and applications which do not depart from the spirit and scope of the invention are deemed to be covered by the invention which is limited only by the claims which follow.

What is claimed is:

1. A trim and damping cylinder comprising:
a container including means to pressurize said container with medium;
piston means within said container dividing said container into first and second container portions, said piston means when in a predetermined position having equal working areas acting on the first and second container portion sides thereof;
means enabling a restricted flow of pressurized medium between said first and second container portions to dampen motion between said container and said piston means;
means for increasing the working area of said piston means on the first container portion side thereof when said piston means are moved toward said first container portion from said predetermined position; and
means for decreasing the working area of said piston means on the first container portion side thereof when said piston means are moved away from said first container portion and said predetermined position; whereby said piston means tend to return to said predetermined position.

2. The cylinder defined in claim 1 including:
means connected to said container to selectively disable said working area increasing means and enable said working area decreasing means so that said piston means tend to move in the direction of said first container portion of said cylinder.

3. The cylinder defined in claim 1 including:
relief means in communication with said first and second container portions for relieving predetermined differential pressure between said container portions.

4. A positioning damper comprising:
a container connected to a source of pressurized medium;
a piston rod extending through a first end of said container;
a piston within said container connected to said piston rod dividing said container into first and second container portions;
means enabling a restricted flow of pressurized medium between said first and second container portions to dampen motion between said container and said piston rod;
means reducing the volume of pressurized medium within said container when said piston is moved from a predetermined position toward said first container end; and
means reducing the volume of pressurized medium within said container when said piston is moved from the predetermined position away from said first container end; whereby said piston tends to remain at the predetermined position.

5. The damper defined in claim 4 wherein:
said pressurized medium is relatively incompressible.

6. The damper defined in claim 4 wherein said restricted flow enabling means include:
at least one orifice through said piston communicating said first and second container portions.

7. The damper defined in claim 4 including:
means to selectively neutralize one of said volume reducing means so that said piston tends to move toward one end of said container.

8. The damper defined in claim 4 including:
means for relieving predetermined differential pressure acting across said piston, said relief means enabling substantial flow of medium in comparison to the flow of medium enabled by said restricted flow enabling means.

9. The damper defined in claim 8 wherein:
said differential pressure relief means are positioned within said piston rod to move therewith.

10. A cylinder comprising:
a cylinder housing having first and second internal cylinder walls, said first cylinder wall having a larger diameter than said second cylinder wall, an abutment surface between said walls defining a center position reference in said cylinder, and means to feed pressurized medium into said cylinder;
a first piston within said cylinder housing riding on said second cylinder wall;
a connecting rod attached to said first piston, said connecting rod including a first rod portion at one side of said first piston and a second rod portion at the other side of said first piston; and
a second piston within said cylinder housing riding on said first and second cylinder walls, said second piston being adapted for abutment with said first piston, said second piston also being adapted for abutment with said cylinder housing abutment surface to restrict travel of said second piston in a predetermined direction;
said first cylinder wall and said first rod portion defining a first working area, said second cylinder wall and said first rod portion defining a second working area smaller than said first working area and said second cylinder wall and said second rod portion defining a third working area smaller than said first working area but larger than said second working area, said first working area working on said first piston in opposition to said third working area when said first piston is in abutment with said second piston so said first piston tends to move away from said second piston, said second working area working on said first piston in opposition to said third working area when said first piston is not in abutment with said second piston, whereby said piston rod tends to return to a position where said first piston is in abutment with said second piston and said second piston is in abutment with said cylinder housing abutment surface.

11. The cylinder defined in claim 10 wherein:

said second piston and said first and second cylinder walls define a closed chamber; and said cylinder housing includes:

means to selectively feed pressurized medium in said closed chamber to neutralize a portion of said first working area so that said first piston tends to assume a position in abutment with said second piston where said second piston is out of abutment with said cylinder housing abutment surface.

12. The cylinder defined in claim 10 including:

orifice means through said first piston to allow restricted flow of medium from one side of said first piston to the other to damp out motion between said cylinder housing and said piston rod.

13. The cylinder defined in claim 10 including:

relief valve means within said cylinder housing operatively connected to relieve pressure of medium above a predetermined pressure from one side of said first piston to the other.

14. The cylinder defined in claim 10 including:

means to allow restricted flow of medium from one side of said first piston to the other to damp out motion between said cylinder housing and said piston rod.

15. The cylinder defined in claim 14 including:

relief valve means within said piston rod to relieve pressure of medium above a predetermined pressure from one side of said first piston to the other.

* * * * *